Feb. 3, 1925.

H. A. DOUGLAS

ELECTRIC SWITCH

Filed Nov. 27, 1922

1,524,918

Inventor:
Harry A. Douglas
By L. L. Gragg Atty

Patented Feb. 3, 1925.

1,524,918

UNITED STATES PATENT OFFICE.

HARRY A. DOUGLAS, OF BRONSON, MICHIGAN.

ELECTRIC SWITCH.

Application filed November 27, 1922. Serial No. 603,402.

*To all whom it may concern:*

Be it known that I, HARRY A. DOUGLAS, citizen of the United States, residing at Bronson, in the county of Branch and State of Michigan, have invented a certain new and useful Improvement in Electric Switches, of which the following is a full, clear, concise, and exact description.

My invention relates to electric switches, one embodiment thereof being of particular use for controlling stop lights or signals upon automobiles, though the invention is not to be limited to any particular use to which it may be put.

The invention has for its object the provision of a switch structure whose parts are few and simple in formation.

In accordance with one of the characteristics of the invention a spring is employed for effecting relative movement of switch members in one direction, this spring being of coiled wire held in assembly with the movable member of the switch and anchored at its ends to this member and a complemental member. In the preferred embodiment of the invention this spring carrying member of the switch is in the form of a flanged cup and the spring is of coiled wire that is disposed against the body of the cup, the spring being anchored at one end to the cup and at the other end to a plate upon which the cup is mounted to turn. There is a retaining member for holding the spring against the flange of the cup and in order to prevent undue relative movement between this retaining member and the spring a positioner is carried by the cup that engages the retaining member. This positioner is preferably in the form of a hollow contact carrier which carries an inwardly spring pressed contact that projects into the cup space to be engageable with one or more complemental contacts upon the mounting plate. The cup is desirably also formed with an arm by which it may be connected with the clutch or brake lever of an automobile whereby the switch may be automatically operated when the automobile is stopped or its speed is checked. In the preferred embodiment of the invention there are two complemental contacts, the contacts encountered being included in a circuit that contains a warning lamp which may be designated "Slow." The next contact may be a terminal of a stop light in accordance with common practice.

Figure 1:
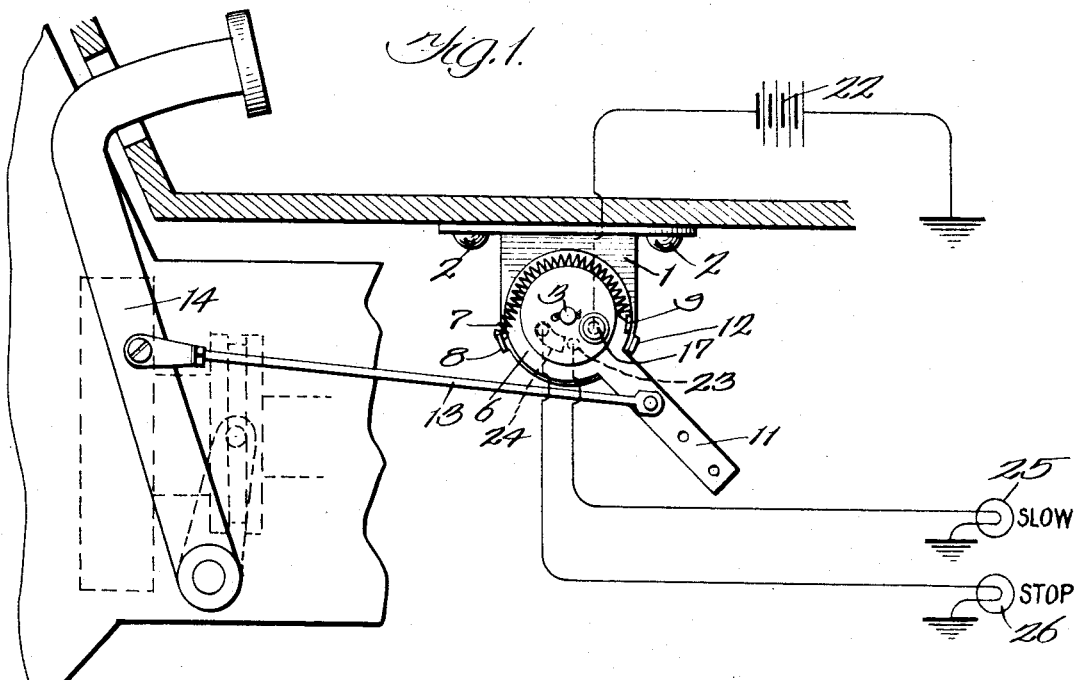
Figure 2:
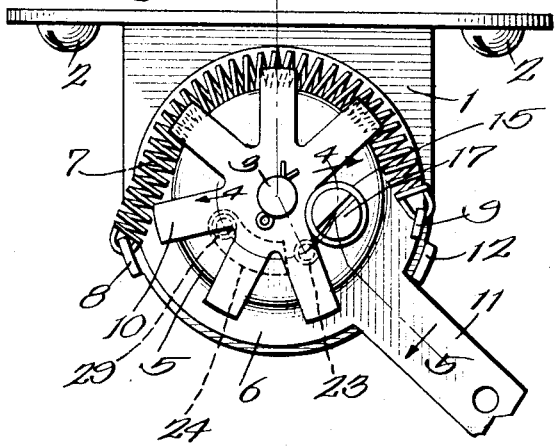
Figure 3:
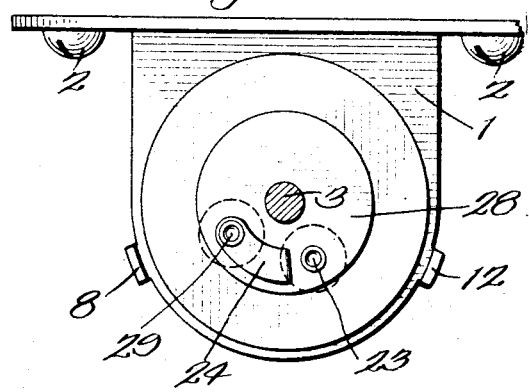
Figure 4:
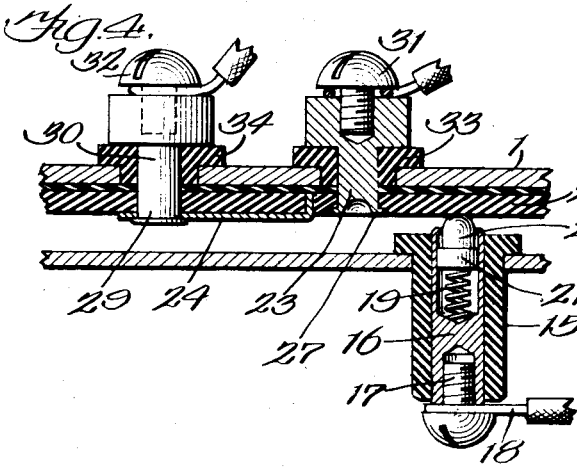
Figure 5:
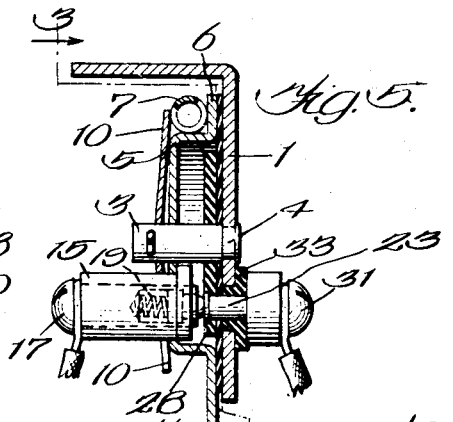

The invention will be more fully explained by reference to the accompanying drawing in which Fig. 1 is a view illustrating the preferred embodiment thereof as applied to an automobile, this figure being somewhat diagrammatic; Fig. 2 is a view showing a part of the structure appearing in Fig. 1 but on a larger scale; Fig. 3 is a view on line 3—3 of Fig. 5; Fig. 4 is a sectional view on line 4—4 of Fig. 2; and Fig. 5 is a sectional view on line 5—5 of Fig. 2.

Like parts are indicated by similar characters of reference throughout the different figures.

The switch illustrated includes a mounting plate 1 which is shown in the form of a bracket that is held in position by means of screws 2. A pin 3 is carried by and projects transversely from a portion of the mounting plate, this pin being formed with an annular groove 4 where it passes through the mounting plate to receive the surrounding portion thereof, this being the preferred way of holding the pin and mounting plate in fixed relation. The pin 3 passes through the bottom of a cup 5 that is journaled upon the pin. This cup is formed with a flange 6 that takes part in positioning the coiled spring 7 that is employed for effecting relative movement of members of the switch in one direction, this spring being anchored at one end to the ear 8 which is carried by and extends transversely from the mounting plate and at its other end to the ear 9 which is carried by and extends transversely from the flange of the cup. The spring is preferably coiled and engages the body of the cup, being caused to assume arcuate form thereby, this spring being mainly within the circle of the cup flange.

The spring is held within the zone of the cup body by means of a retaining member 10 which is also journaled upon the pin 3. This retaining member is desirably of spider formation whose legs project laterally beyond the bottom of the cup to form with the cup body and the cup flange a receiving space in which the spring is retained and positioned by the cup body, cup flange, and retaining member. The cup member of the switch is also formed with an operating arm 11 which is virtually a continuation of the cup flange. The spring normally holds the operating arm against the stop 12 upon the mounting plate. Linkage 13 connects the operating arm 11 with the clutch pedal 14 or other controlling lever.

A contact carrier 15, preferably in the form of a sleeve of insulating material, is carried by and projects through the bottom of the cup, this contact carrier passing between two of the legs of the retaining member 10 to hold this retaining member and the cup substantially in fixed relation. A contact member 16 is located within the bore of the sleeve 15, the outer end of this contact member receiving a binding screw 17 to bring this member in electrical connection with a current conducting wire 18. The inner end of the contact member 16 is formed with a bore that receives a coiled spring 19 which presses inwardly upon a contact 20. This contact has a head 21 that engages the contracted inner end of the member 16 when the parts are disassembled, whereby the contact 20 and its carrier are maintained in assembly. The contact is illustrated as being grounded through a source of current 22. There are two contacts 23 and 24 having engaging ends within the cup space. The contact 23 is grounded through a warning lamp or signal 25 which, when glowing, may cause the word "Slow" or other suitable sign to appear. The contact 24 is grounded through a lamp 26 which, when glowing, may cause the word "Stop" or other suitable sign to appear.

The contact 23 is desirably circular and cupped to form an assembling flange 27 that engages the insulating plate 28 which is assembled with the mounting plate 1 and which insulating plate faces the cup and is engaged by its flange. The contact 23 is of small diameter to be momentarily engaged by the contact 20 when the cup is turned by the clutch lever 14 when operated to release the engine clutch.

The contact 24 is elongated so that the stop signal 26 will be displayed throughout a longer range of movement of the clutch lever. This contact 24 is preferably in the form of a strip of metal that has an angular end which extends into the insulating plate 28. The other end of the contact 24 is held in fixed relation with the insulating plate 28 by means of the flange 29 upon the inner end of the binding post 30. The contact 23 also has the formation of a binding post, both binding posts having their outer ends in the form of heads which receive the binding screws 31 and 32. Bushings 33 and 34 of insulating material receive the shanks of the binding posts, these bushings being interposed between the heads of the binding posts and the mounting plate 1. The flanges 27 and 29 are desirably formed after the shanks of the binding posts have been passed through the parts that receive them, whereby these binding posts also serve to effect the assembly of the insulating plate 28 and the mounting plate 1.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

An electric switch including a mounting plate; a cup journaled upon the mounting plate; complemental contacts within the cup space, one assembled with the cup and the other with the plate; and a coiled spring anchored at one end to the cup and at its other end to the plate, this spring being in the zone of the cup body and laid upon the exterior of the cup.

In witness whereof, I hereunto subscribe my name this 14th day of November, A. D. 1922.

HARRY A. DOUGLAS.